United States Patent [19]

Bazin

[11] 3,786,177

[45] Jan. 15, 1974

[54] APPARATUS FOR AUTOMATIC COLOR BALANCING OF TELEVISION CAMERA SIGNALS

[75] Inventor: Lucas John Bazin, Stratford, N.J.

[73] Assignee: RCA Corporation, New York, N.Y.

[22] Filed: June 19, 1972

[21] Appl. No.: 264,255

[52] U.S. Cl. .......... 178/5.4 BT
[51] Int. Cl. .......... H04n 9/08
[58] Field of Search .......... 178/5.4 R, 5.4 BT, 178/5.4 AC

[56] References Cited

UNITED STATES PATENTS

| | | | |
|---|---|---|---|
| 3,627,911 | 12/1971 | Kubota et al. | 178/5.4 BT |
| 3,604,841 | 9/1971 | Ettlinger et al. | 178/5.4 BT |
| 2,969,424 | 1/1961 | Tait | 178/5.4 BT |

*Primary Examiner*—Robert L. Richardson
*Attorney*—Eugene M. Whitacre et al.

[57] ABSTRACT

First, second and third signal level comparators are used to compare against a predetermined signal level respective ones of the red, green and blue color signals generated by a television camera. The outputs of the comparators are combined in an AND gate to ascertain when an essentially black or essentially white signal obtains. When such signal is present, the differences between red and green color signals and between blue and green color signals are reduced by servomechanisms.

7 Claims, 4 Drawing Figures

APPARATUS FOR AUTOMATIC COLOR BALANCING OF TELEVISION CAMERA SIGNALS

The present invention relates to apparatus for automatic color balancing of color signals generated by a color television camera, wherein the relative black levels and relative amplitudes of those color signals are adjusted.

Automatic color balancing has been used to adjust the black levels and gains of the red and blue color signals relative to those of the green signals in the processing amplifier following a television camera. This is particularly important to do when the program material picked up by the television camera has been recorded on motion picture film. Previous automatic color balancing systems have made their adjustments when the excursions of the luminance signal formed by additive matrixing of the red, green and blue color signals are smaller than 7 percent of the maximum luminance signal value or when those excursions are larger than 95 percent of the maximum luminance signal value, which excursions are presumed to correspond to black and to white signals, respectively. These systems employing luminance signal detection undesirably perform automatic color balancing for blue and flesh-tone portions of the scene unless auxiliary circuitry to inhibit the automatic color balancing for such conditions is provided. This auxiliary inhibitory circuitry has included synchronous detector circuits operating upon the composite video signal provided from the subsequent color-plexer to determine when blue or flesh-tone portions of the scene occur.

Apparatus for automatic color balancing was sought which required no auxiliary inhibitory circuitry, but correctly ascertained when substantially black or substantially white signals were to be provided. It was desired to provide for automatic color balancing entirely within the confines of the processing amplifier preceding the color-plexer without the need for connecting back signals from the color-plexer.

The present invention is embodied in apparatus for use in automatic color balancing of first, second and third color signals. First, second and third signal level comparator means are used for comparing respective separate ones of the first, second and third color signals with a predetermined signal level. Each signal level comparator means provides an indication of whether the excursion of the color signal thereto applied exceeds the predetermined signal level in a predetermined direction of excursion. A combining means is coupled respectively to each of the comparator means, and provides an indication of when all of the comparator means coupled thereto provide their indications. During the most recent such time as the combining means provides its indication, the means to provide the first control signal provides that signal responsive to the difference in amplitude between said first and said third color signals, and the means to provide the second control signal provides that signal responsive to the difference in amplitude between the second and third color signals. These first and second control signals indicate respective adjustments to be made to first and second color signals relative to a third color signal.

The present invention will be better understood by reference to the accompanying drawings and the specification in which.

Figure 1:
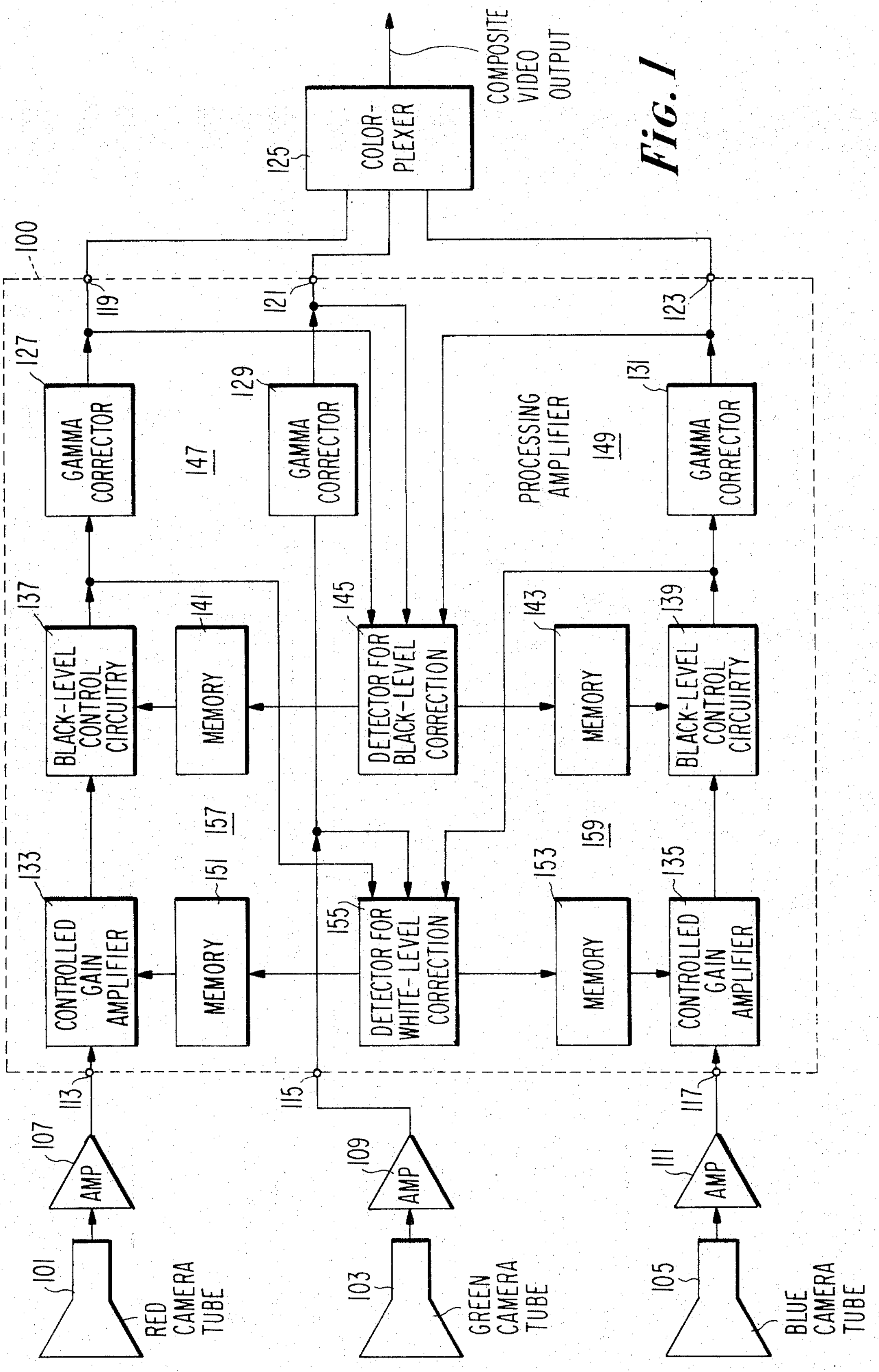
FIG. 1 is a block diagram of an automatic color balancing system embodying the present invention.

FIG. 1 shows an automatic color balancing system incorporated in a processing amplifier 100. Red, green and blue color signals respectively originate at camera tubes 101, 103, 105. The original red, green and blue color signals are respectively amplified in amplifiers 107, 109, 111 associated with the camera head and are thereafter respectively applied to input terminals 113, 115, 117 of the processing amplifier 100. The terminals 113, 115 and 117 are coupled to the input circuits of gamma correctors 127, 129, 131, respectively, and thence to output terminals 119, 121, 123. The gamma-corrected color signals appearing at the terminals 119, 121, 123 are applied to a colorplexer 125 which combines them to provide a composite video output signal.

The gamma correctors 127 and 131 are each preceded by the cascade combination of a controlled gain amplifier (133, 135) and a black-level control circuit (137, 139). The black-level control circuits 137, 139 add varying amounts of black-level pedestal to the red and blue color signals, respectively, in response to first and second control signals, respectively, as provided from analog memories 141, 143, respectively. The information retained in the memories 141, 143 is obtained from the red, blue and green color signals by a detector 145 which provides black-level correction information during substantially black portions of the scene presented to the camera tubes 101, 103, 105.

The signal applied to the memory 141 by the detector 145 during black portions of the scene is responsive to the difference between the amplitude of the red and the green gamma-corrected color signals at the output circuits of the gamm correctors 127, 129, respectively. The signal applied to the memory 143 by the detector 145 during black portions of the scene is responsive to the difference between the amplitudes of the blue and the green gamma-corrected signals at the output circuits of the gamma correctors 131, 129, respectively. A black-level correction feedback loop 147 containing elements 137, 127, 145, 141 and the black-level correction feedback loop 149 containing elements 139, 131, 145, 143 are arranged to degenerate the discrepancies in the black-levels of the gamma-corrected red color signal (at 119) and the gamma-corrected blue color signal (at 123) respectively, as compared to the black level of the gamma-corrected green color signal (at 121).

The controlled gain amplifiers 133, 135 are responsive to third and fourth control signals from analog memories 151, 153, respectively. The information retained in the memories 151, 153 is obtained from the red, blue and green color signals by a detector 155 which provides white-level correction information during substantially white portions of the scene presented to the camera tubes 101, 103, 105. The signal applied to the memory 151 by the detector 155 during white portions of the scene is responsive to the difference between the amplitudes of the red and the green color signals at the input circuits of the gamma correctors 127, 129, respectively. The signal applied to the memory 153 by the detector 155 during white portions of the scene is responsive to the difference between the amplitudes of the blue and the green color signals at the input circuits of the gamma correctors 131, 129, respectively. The white-level correction feedback loop 157 containing elements 133, 137, 155, 151 and the white-level correction feedback loop 159 containing elements 135, 139, 155, 153 are arranged to degenerate the discrepancies in the amplitudes of the red and the blue color signals respectively as compared to the green color signal for neutral-color signals (whites and grays), which is often referred to as "white-level correction."

Variations in the order of cascade connection of a controlled gain amplifier for white-level correction, black-level correction and gamma correction and variations as to the points in that cascade combination from which error signals are obtained are met in various processing amplifier designs. The gamma correctors 127, 129, 131 increase the gain of the black-going portions of the signals applied to their input circuits compared to the white-going portions of such signals. Taking error signals for black-level correction from the output circuits of the gamma correctors 127, 129, 131 as shown in FIG. 1 can increase the resolution against error of the black-level correction system. Taking error signals for white-level correction before gamma correctors 127, 129, 131 better preserves the resolution against error of the white-level correction system. Taking error signals for white-level correction after black-level circuits 137, 139 avoids having to provide separate means for black-level restoration of the controlled gain amplifier 133, 135 output signals, such black-level restoration being necessary to provide proper biasing for the input circuits of the detector 155.

Figure 2:
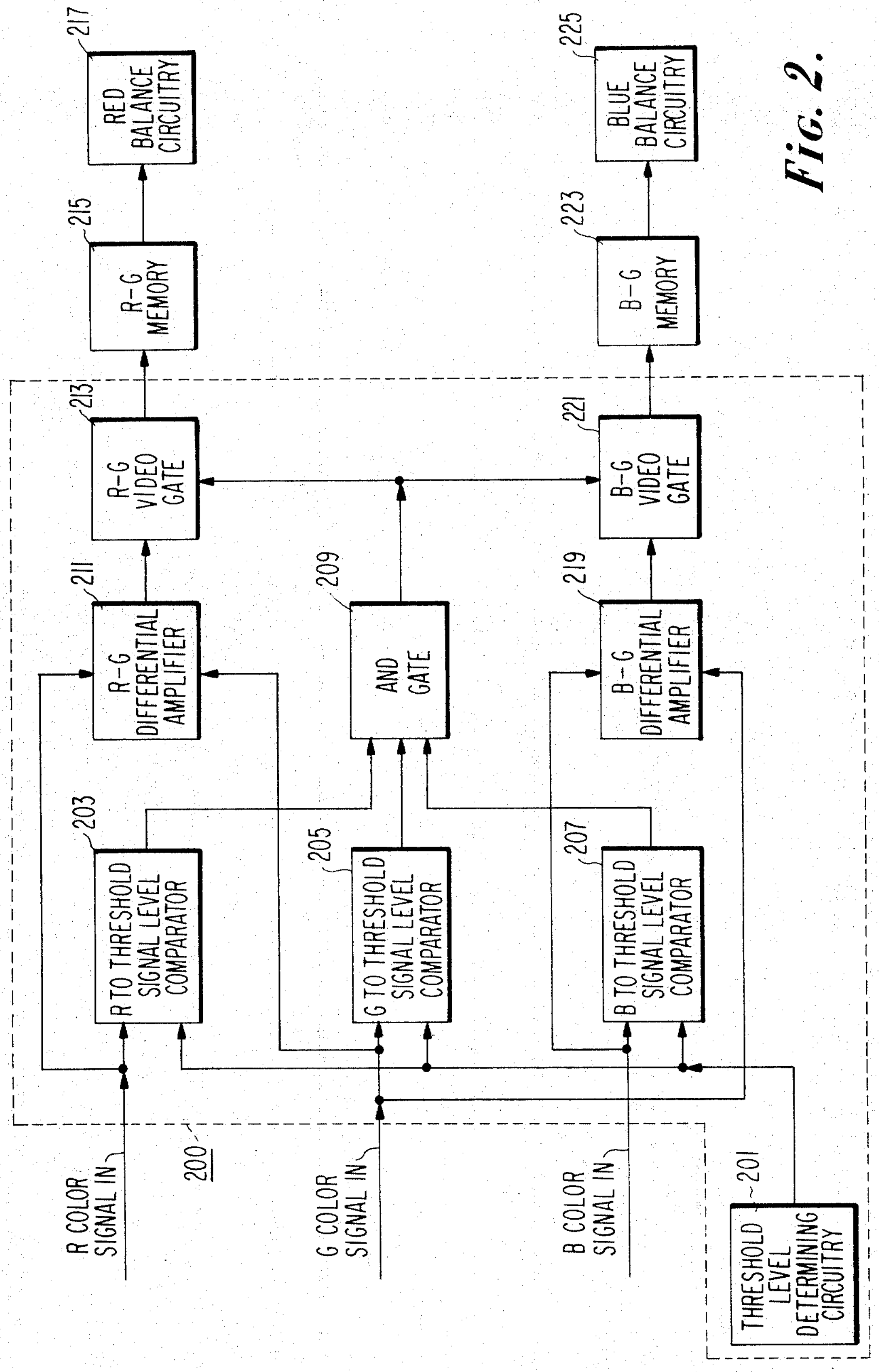
FIG. 2 is a block diagram of a detector embodying the present invention.

FIG. 2 shows a detector 200 embodying the present invention, which with suitable modification may be used in FIG. 1 either for the detector used in automatic black-level correction 145 or for the detector means used in automatic white-level correction 155.

If the detector 200 be presumed to be used for automatic black-level correction, the threshold level determining circuitry 201 is set to provide a threshold signal level at approximately 10 percent of full color signal amplitude, which signal level is applied to signal level comparators 203, 205, 207.

Red (R), green (G) and blue (B) color signals (such as may be taken respectively from the output circuits of the gamma correctors 127, 129, 131 of FIG. 1, for instance) are applied respectively to comparators 203, 205, 207 for comparison with the threshold signal level. When its color signal exceeds the threshold signal level, the output circuit of the comparator 203, 205 or 207 responds with a logic 0; and when its color signal does not exceed the threshold signal level, the comparators respond with a logic 1. Logic 1's are provided at the outputs of all three comparators 203, 205, 207 when the scene described by the color signals is substantially black. This condition is discerned by coupling the output circuits of each of the comparators 203, 205, 207 to an AND gate 209 which provides a logic 1 output only for this condition.

An R-G signal provided at the output circuit of a differential amplifier 211 in response to the difference between the amplitudes of the red and the green color signals applied to its input circuit is applied via video gate 213 to an analog memory 215 only when the AND gate 209 provides a logic 1 output. The memory 215, which may correspond to memory 141 in FIG. 1, supplies a control signal to the red balance circuitry 217, which would then correspond to the black-level control circuitry 137 in FIG. 1.

Similarly, a B-G signal provided at the output circuit of a differential amplifier 219 in response to the difference between the amplitudes of the blue and the green color signals applied to its input circuit is applied via video gate 221 to an analog memory 223 only when the AND gate 209 provides a logic 1 output. The memory 223, which may correspond to memory 143 in FIG. 1, supplies a control signal to the blue balance circuitry 225, which would then correspond to the black-level control circuitry 139 in FIG. 1.

In prior art circuitry the logic 1 to activate the video gates 213, 221 would be provided by a signal level comparator comparing luminance signal to a threshold signal level approximately 5 or 10 percent from black-level and indicating the luminance signal to be blacker than the threshold value. A low or moderate-brightness saturated blue portion of the scene would create so small a luminance signal amplitude that this logic 1 indicating a substantially black signal would be undesirably and erroneously provided. This occurs because the luminance signal has so small a component of the blue color signal.

In the detector 200 this shortcoming is not to be found. On a low-or moderate-brightness saturated blue signal the comparator 203 and 205 will provide a logic 1 signal to the AND gate 209 since the red and green color signals are of low amplitude indicating the absence of red and green color components in the scene. The comparator 207 establishes a threshold level against which blue color signal alone is compared. On even low-brightness saturated blue signals this blue color signal will not be close enough to black level to cause the comparator 207 to provide a logic 1 to the AND gate 209, in consequence of which the output circuit of the AND gate 209 will remain in its 0 logic state. This prevents the video gates 213, 221 from passing R-G and B-G signal. Therefore the blue portions of scene do not undesirably initiate an erroneous black-level correction.

Figure 3:
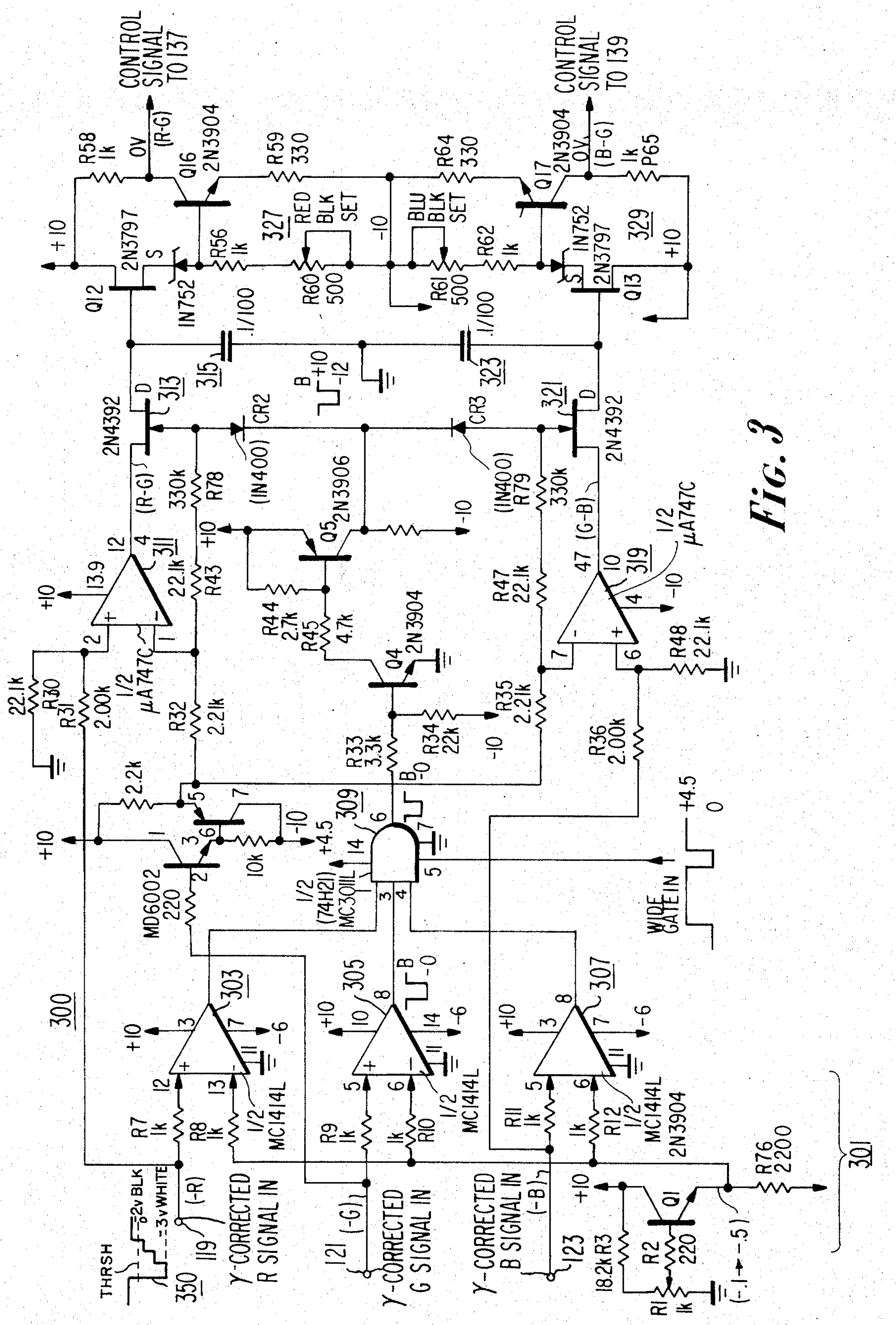
FIG. 3 is a schematic circuit diagram of a detector circuit for developing control signals for aytomatic black-level setting.

FIG. 3 shows in schematic form detector 300 and its associated memory to be used in automatic black-level correction. The final two digits of corresponding portions of detector 200 and 300 in FIGS. 2 and 3 are the same. Each of the gamma-corrected red, green and blue color signals from terminals 119, 121, 123, respectively may range from a −0.2 volts black level to a −3.0 volts white-level, as shown in input voltage waveform 350. The threshold signal level applied to comparators 303, 305, 307 from threshold level determining circuitry 301 is arranged to be somewhat less positive than −0.2 volts, for example, −0.5 volts. An input color signal excursion less negative than this threshold voltage will cause a logic 1 output signal from the comparator 303, 305, 307 to which it is applied.

The AND gate 309 is supplied a "wide gate signal" to its terminal 5 to inhibit a logic 1 from appearing at its output during blanking intervals and, to prevent shading and edge-transient phenomena from initiating black-level correction, during edge portions of the pictures.

The analog memories 315, 323 are each high quality polystyrene capacitors capable of retaining charge on themselves for hours of time. Together with the field-effect transistors 313, 321 used as video gates the capacitors 315, 323 form sample-and-hold circuits.

Amplifiers 327 and 329 have control voltages developed across capacitors 315, 323, respectively, applied to their input circuits, which input circuits by virtue of the MOS transistor devices therein employed present very high input impedances and so drain very little charge from those capacitors. Amplifiers 327 and 329 provide amplified control voltages at low impedance levels (shown as 1 kilohom) to the black level control circuits 137, 139, respectively.

If, in FIG. 2, the detector 200 be presumed to be used for automatic white-level correction, rather than black-level correction the threshold level determining circuitry 201 is set to provide threshold signal level at approximately 90 percent of full color signal amplitude, which signal level is applied to signal level comparators 203, 205, 207. When the color signals applied to the input circuits of comparators 203, 205, 207 all exceed their respective 90 percent threshold signal levels the scene described by the color signals is substantially white. The output circuits of comparators 203, 205, 207 each supply logic 1's to the AND gate 209, and the AND gate 209 responds to provide a logic 1 output for this particular condition. This makes video gates 213 and 221 transmissive. R-G and B-G signals provided at the output circuits of differential amplifier 211 and 219, respectively, are coupled thereby to analog memories 215 and 223, respectively. The memories 215 and 223 (which may correspond to memory 151 and 153 in FIG. 1) supply control signals to the red balance circuitry 217 and blue balance circuitry 225 (which would then correspond to the controlled gain amplifiers 133 and 135 in FIG. 1).

In prior art circuitry the logic 1 to activate the video gates 213, 221 would be provided by a signal level comparator comparing luminance signal to a threshold signal level approximately 90 or 95 percent of white level and indicating the luminance signal to be whiter than the threshold value. A moderately bright saturated yellow or flesh-tone portions scene would create so large a luminance signal amplitude that this logic 1 indicating a substantially white signal would be undesirably and erroneously provided. This occurs because the luminance signal has substantial components of red and green color signals.

In the detector means 200 this shortcoming is not to be found. On a moderately bright saturated yellow or flesh-tone signal the comparator 203 and 205 will provide a logic 1 signal to the AND gate 209 since the red and green color signals are of high amplitude indicating the presence of red and green (i.e., yellow) color components in the scene. The comparator 207 establishes a threshold level against which blue color signal alone is compared. On even high brightness yellow or flesh-tone portions of the scene this blue color signal will not be large enough to approach white level so as to cause the comparator 207 to provide a logic 1 to the AND gate 209, in consequence of which the output circuit of the AND gate 209 will remain in its 0 logic state.

This prevents the video gates 213, 221 from passing R-G and B-G signal, so that the yellow or flesh-tone portions of the scene do not undesirably initiate an erroneous white level correction.

Figure 4:
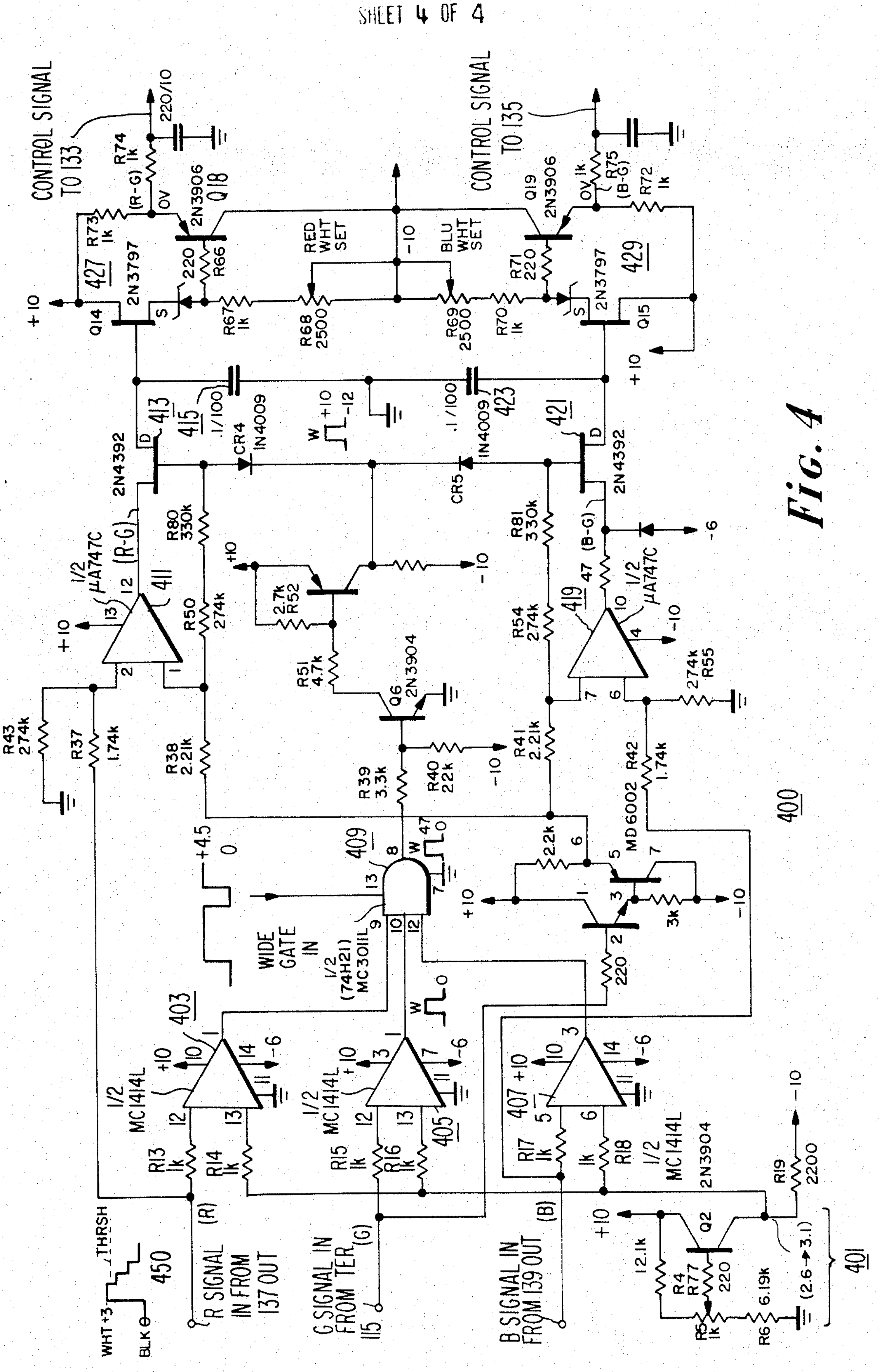
FIG. 4 is a schematic circuit diagram of a detector for developing control signals for automatically controlling color signal gains and, concomitantly, white-level.

FIG. 4 shows in schematic form detector means 400 to be used in automatic black-level correction. The final two digits of corresponding portions of detector means 200 and 400 in FIGS. 2 and 4 are the same. Each of the red, green and blue color signals obtain from the input circuits of gamma correctors 127, 129, 131, respectively, may range from a 0 volts black level to a +3.0 volts white-level, as shown in input voltage waveform 450. The threshold signal level applied to comparators 403, 405, 407 from threshold level determining circuitry 401 is arranged to be somewhat less positive than 3.0 volts, for example, 2.7 volts. An input color signal excursion more positive than this threshold voltage will cause a logic 1 output signal from the comparator 403, 405, 407 to which it is applied.

The AND gate 409 is supplied a "wide gate signal" to its terminal 13 to inhibit a logic 1 from appearing at its output during edge portions of the pictures to prevent shading and edge transient phenomena from initiating white-level correction.

The analog memories 415, 423 are each high quality polystyrene capacitors capable of retaining charge on themselves for hours of time. Together with the field-effect transistors 413, 421 used as video gates the capacitors 415, 423 form sample-and-hold circuits.

What is claimed is:

1. Apparatus applicable for use in automatic color balancing of first, second and third color signals, comprising:

first, second and third input terminals adapted for application of said first, said second and said third color signals;

first, second and third signal level comparator means, each having an input circuit and each having an output circuit, to provide an indication of when the excursion of input signal applied to its said input circuit exceeds a first predetermined signal level in a predetermined direction of excursion;

first, second and third coupling means respectively connecting said input circuits of said first, said second and said third signal level comparator means to respective separate ones of said first, said second and said third input terminals;

first combining means having input circuits coupled respectively to each of said first, said second and said third comparator means output circuits and having an output circuit at which is provided an indication of when all of said first, said second and said third comparator means provide their said indications;

means to provide a first control signal responsive to the difference in amplitude between said first and said third signal level comparator input signals during the most recent such time as said first combining means provides or is provided its said indication, means to provide a second control signal responsive to the difference in amplitude between said second and said third signal level comparator input signals during the most recent such time as said first combining means provides or is provided its said indication, whereby said first and said second control signals indicate adjustments to be made to said first and to said second signal level comparator input signals, respectively, relative to said third signal level comparator input signal for color balancing to obtain, and wherein:

first and second black-level control means each provides at its output circuit an output signal similar in waveform signal applied to its input circuit but with black level adjusted in accordance with a respective separate one of said first and said second control signals, said first and said second black-level control means being included in said first and said second coupling means, the input circuits of said first and said second black-level control means being coupled respectively to said first and to said second input terminals;

fourth and fifth coupling means connecting said output circuits of said first and said second black-level control means to said input circuits of said first and said second signal level comparator means, respectively, and said first, said second and said third signal level comparators each provides its indication when its input signal swings past said first predetermined signal level towards black.

2. Apparatus applicable for use in automatic color balancing as claimed in claim 1 wherein:

first, second and third gamma correction means are included in said third, said fourth and said fifth coupling means, respectively.

3. Apparatus applicable for use in automatic color balancing as claimed in claim 1 having:

a first controlled gain amplifier being included in said first coupling means between said first input terminal and said input circuit of said first black-level control means and providing gain responsive to a third control signal, a second controlled gain amplifier being included in said second coupling means between said second input terminal and said input circuit of said second black-level control circuitry and providing gain responsive to a fourth control signal, fourth, fifth and sixth level comparator means each comparing an input signal applied to its input circuit with a second predetermined signal level which is towards white from said first predetermined signal level and providing at its output circuit an indication of when the excursion of its said input signal swings past said second predetermined signal level towards white, means coupling said input circuits of said fourth, said fifth and said sixth signal level comparator means to said output circuit of said first black-level control means, said output circuit of said second black-level control means and said third terminal, respectively;

second combining means having input circuits coupled respectively to each of said fourth, said fifth and said sixth comparator means output circuits and providing at its output circuit an indication of when all of said fourth, said fifth and said sixth comparator means provide their said indications;

means to provide said third control signal responsive to the difference in amplitude between said fourth and said sixth signal level comparator input signals during the most recent time as said second combining means provides or provided its said indication and, means to provide said fourth control signal responsive to the difference in amplitude between said fifth and said sixth signal level comparator input signals during the most recent time as said second combining means provides or provided its said indication.

4. Apparatus applicable for use in automatic color balancing of first, second and third color signals, comprising:

first, second and third input terminals adapted for application of said first, said second and said third color signals;

first, second and third signal level comparator means, each having an input circuit and each having an output circuit, to provide an indication of when the excursion of input signal applied to its said input circuit exceeds a first predetermined signal level in a predetermined direction of excursion;

first, second and third coupling means respectively connecting said input circuits of said first, said second and said third signal level comparator means to respective separate ones of said first, said second and said third input terminals;

first combining means having input circuits coupled respectively to each of said first, said second and said third comparator means output circuits and having an output circuit at which is provided an indication of when all of said first, said second and said third comparator means provide their said indications;

means to provide a first control signal responsive to the difference in amplitude between said first and said third signal level comparator input signals during the most recent such time as said first combining means provides or is provided its said indication, means to provide a second control signal responsive to the difference in amplitude between said second and said third signal level comparator input signals during the most recent such time as said first combining means provides or is provided its said indication, whereby said first and said second control signals indicate adjustments to be made to said first and to said second signal level comparator input signals, respectively, relative to said third signal level comparator input signal for color balancing to obtain, and having, a source of black pedestal signal, a first black-level control circuit included in said first coupling means and adding to color signals processed therethrough said black pedestal signal in an amount responsive to said first control signal, and a second black-level control circuit included in said second coupling means, and adding to color signals processed therethrough said black pedestal signal in an amount responsive to said second control signal.

5. Apparatus applicable for use in automatic color balancing as claimed in claim 2 wherein each of said means to provide a control signal comprises:

a differential amplifier having an output circuit and having first and second input circuits coupled to separate ones of said signal level comparator input signals, a memory having an output circuit from which its said control signal is provided in response to stored information, and an input circuit for application of information to be stored and, a video gate coupling said differential amplifier output circuit to said memory input circuit whenever and only whenever said first combining means provides its said indication of when all of said first, said second and said third comparator means provide their said indications.

6. Apparatus applicable for use in automatic color balancing of a plurality of number N color signals comprising:

a plurality of number N input terminals, each adapted for application of a respective one of said plurality of color signals;

a plurality of number N signal level comparator means, each having an input circuit and each having an output circuit, to provide an indication of when the excursion of its input signal exceeds a predetermined signal level in a predetermined direction of excursion;

a plurality of number N coupling means coupling said input terminals to respective separate ones of said input circuits of said signal level comparator means;

combining means having a plurality of number N input circuits coupled respectively to separate ones of said output circuits of said plurality of signal level comparator means and having an output circuit at which is provided an indication of when all of said signal level comparator means thereto coupled provide their respective said indications;

a plurality of number (N−1) means to provide difference signals each having an output circuit responsive to the difference in amplitude between signal applied to a respective separate one of said input terminals except the last and signal applied to said last input terminal;

a plurality of number (N−1) signal gates each having an input circuit coupled to a respective one of said output circuits of said means to provide difference signals, each having a control circuit coupled to said output circuit of said combining means and each having an output circuit providing an output signal responsive to signals at its said input circuit when its said control circuit is provided said indication from said combining means; and a plurality of number N output terminals, all but the last being coupled from respective separate ones of said output circuits of said signal gates and said last output terminal being coupled from said last input terminal, and including:

a plurality of number (N−1) memories each having an output circuit from which a control signal is provided in response to stored information and each having an input circuit for application of information to be stored coupled to a respective one of said output circuits of said signal gates and, a plurality of number (N−1) black-level correction circuits being included in respective ones of said plurality of coupling means except the last, having input circuits coupled to respective ones of said input terminals except said last, having output circuits coupled to respective ones of said input circuits of said signal level comparator means and having circuits to accept control signals to determine black-level correction as supplied respectively from separate ones of said output circuits of said memories.

7. Apparatus applicable for use in automatic color balancing of a plurality of color signals as claimed in claim 6 including, a plurality of number (N−1) controllable gain amplifiers also being included in respective ones of said plurality of coupling means except the last in cascade connection with said black-level correction circuits and being provided with respective signals to control their gains from respective separate ones of said output circuits of said memories.

* * * * *

UNITED STATES PATENT OFFICE

CERTIFICATE OF CORRECTION

Patent No. 3,786,177 Dated January 15, 1974

Inventor(s) Lucas John Bazin

It is certified that error appears in the above-identified patent and that said Letters Patent are hereby corrected as shown below:

Column 8, line 56, that portion reading "Claim 2" should read -- Claim 1 --.

Signed and sealed this 3rd day of September 1974.

(SEAL)
Attest:

McCOY M. GIBSON, JR.
Attesting Officer

C. MARSHALL DANN
Commissioner of Patents

FORM PO-1050 (10-69)
3530 8/72
USCOMM-DC 60376-P69
☆ U.S. GOVERNMENT PRINTING OFFICE : 1969 O—366-334